US012739165B2

(12) United States Patent
Morita et al.

(10) Patent No.: US 12,739,165 B2
(45) Date of Patent: Sep. 15, 2026

(54) COMMUNICATION SYSTEM

(71) Applicant: DENSO CORPORATION, Kariya-city (JP)

(72) Inventors: Manahiro Morita, Kariya-city (JP); Tomohisa Kishigami, Kariya-city (JP); Taku Inagawa, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 46 days.

(21) Appl. No.: 18/894,483

(22) Filed: Sep. 24, 2024

(65) Prior Publication Data

US 2025/0106098 A1 Mar. 27, 2025

(30) Foreign Application Priority Data

Sep. 27, 2023 (JP) ................................ 2023-166034

(51) Int. Cl.
*H04L 41/0686* (2022.01)
*G07C 5/08* (2006.01)
(Continued)

(52) U.S. Cl.
CPC ........ *H04L 41/0686* (2013.01); *G07C 5/0808* (2013.01); *H04L 12/407* (2013.01);
(Continued)

(58) Field of Classification Search
CPC ............... H04L 41/0686; H04L 12/407; H04L 41/0681; G07C 5/0808
(Continued)

(56) References Cited

U.S. PATENT DOCUMENTS 5,491,631 A * 2/1996 Shirane .................. F02M 26/49 701/33.9
8,279,758 B2 * 10/2012 Asaie .................. G06F 11/1443 370/242
(Continued)

FOREIGN PATENT DOCUMENTS

CN 116767312 A * 9/2023
JP 2014-078800 A 5/2014
(Continued)

OTHER PUBLICATIONS

Diagnostic for beginners, Vector Japan Co., Ltd., Retrieved from https://cdn.vector.com/cms/content/know-how/VJ/PDF/For_Beginners_Diagnostic_Communication.pdf on Jul. 22, 2024.
(Continued)

*Primary Examiner* — Tauqir Hussain
(74) *Attorney, Agent, or Firm* — Harness, Dickey & Pierce, P.L.C.

(57) ABSTRACT

A communication system includes a plurality of communication nodes that relay fault diagnosis communication of a diagnosis request and q diagnosis result between a request source and a request destination of the fault diagnosis. A communication setting unit of one of the communication nodes increases a priority of a priority parameter indicating the priority of communication when a communication determination unit determines that the present communication is the fault diagnosis communication either when transmitting the diagnosis request or when transmitting the diagnosis result.

11 Claims, 5 Drawing Sheets

(51) Int. Cl.
*H04L 12/40* (2006.01)
*H04L 12/407* (2006.01)
*H04L 41/0681* (2022.01)

(52) U.S. Cl.
CPC .................. *H04L 41/0681* (2013.01); *H04L 2012/40215* (2013.01); *H04L 2012/40273* (2013.01)

(58) Field of Classification Search
USPC .......................................................... 709/240
See application file for complete search history.

(56) References Cited

U.S. PATENT DOCUMENTS 8,635,269 B2 * 1/2014 LaFrance .............. B60L 53/665 709/228
12,094,267 B1 * 9/2024 Yang ....................... H04L 67/12
12,332,817 B1 * 6/2025 Ning ....................... G06F 21/85
2015/0281022 A1 * 10/2015 Harata ................ H04L 43/0811 370/242
2017/0101025 A1 * 4/2017 Penilla ................. G06Q 20/102
2018/0099856 A1 * 4/2018 Dudar .................... B67D 7/049
2019/0092341 A1 * 3/2019 Stark ..................... B60W 50/08
2019/0210613 A1 * 7/2019 Sun ................... B60W 50/0205
2020/0006969 A1 * 1/2020 Penilla .................... H04L 67/04
2020/0031180 A1 * 1/2020 Usami ................. B60C 23/0401
2021/0029723 A1 * 1/2021 Wu ..................... H04W 72/569
2021/0092019 A1 * 3/2021 Fang ..................... H04W 12/37
2021/0258186 A1 * 8/2021 Tokunaga ......... H04L 12/40039
2023/0045727 A1 * 2/2023 Wang ..................... G06Q 50/10
2023/0097527 A1 * 3/2023 Hoff ........................ B66C 13/44 414/563
2024/0195708 A1 * 6/2024 Adriaanse ........... H04L 43/0882
2024/0367598 A1 * 11/2024 Chibon ................. B60R 16/023

FOREIGN PATENT DOCUMENTS

JP 2015-228622 A 12/2015
WO WO-2009156733 A1 * 12/2009 ............. H04L 69/40
WO WO-2022144642 A1 * 7/2022 ............. A61B 34/20
WO WO-2024209840 A1 * 10/2024 ........ H04W 72/1215

OTHER PUBLICATIONS

QoS—CoS(Class of Service), Retrieved from https://www.infraexpert.com/study/gos12.htm on Jul. 22, 2024.
Nakamura (Vector Japan Co., Ltd), Features mounted in IP packet and transmitted, i.e., UDP/TCP and their upper level protocol, MONOist Apr. 20, 2020, Retrieved from https://monoist.itmedia.co.jp/mn/articles/2004/20/news005_5.html on Jul. 22, 2024.
Difference between TCP and UDP_Heartland.Data Inc., Retrieved from https://hldc.co.jp/blog/2019/07/11/2819/ on Jul. 22, 2024.

* cited by examiner

COMMUNICATION SYSTEM

CROSS REFERENCE TO RELATED APPLICATION

The present application claims the benefit of priority from Japanese Patent Application No. 2023-166034 filed on Sep. 27, 2023. The entire disclosure of the above application is incorporated herein by reference.

TECHNICAL FIELD

The present disclosure relates to a technique for performing fault diagnosis communication.

BACKGROUND

Techniques for performing fault diagnosis communication via a communication node such as a central gateway are known.

For example, a conceivable technique teaches a technique for performing the fault diagnosis communication between a request source and a request destination of fault diagnosis via a communication node such as a central gateway, and the fault diagnosis is executed by a diagnostic tool connected to a DLC, a center that performs wireless communication with a DCM or the like.

Here, DLC is an abbreviation for Diagnostics Link Connector, and DCM is an abbreviation for Data Communication Module.

SUMMARY

According to an example, a communication system may include a plurality of communication nodes that relay fault diagnosis communication of a diagnosis request and a diagnosis result between a request source and a request destination of the fault diagnosis. A communication setting unit of one of the communication nodes may increase a priority of a priority parameter indicating the priority of communication when a communication determination unit determines that the present communication is the fault diagnosis communication either when transmitting the diagnosis request or when transmitting the diagnosis result.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

As a result of detailed study by the inventors, a difficulty has been found such that, as the number of communication nodes that relay the communication in the communication path between the fault diagnosis request source and the fault diagnosis request destination increases, the communication time required for the fault diagnosis communication increases.

In order to reduce the communication time required for the fault diagnosis communication, it is conceivable to perform the fault diagnosis communication using a dedicated bus instead of using a common bus with other communications. However, when arranging a dedicated bus for the fault diagnosis communication, another difficulty may occur that the number of communication channels and buses increases.

One aspect of the present embodiments is to provide a technique for reducing the communication time required for fault diagnosis communication without using a dedicated bus for fault diagnosis communication.

A communication system according to one aspect of the present embodiments includes a plurality of communication nodes that relay a fault diagnosis communication of a diagnosis request and a diagnosis result between a request source of a fault diagnosis and a request destination of the fault diagnosis.

Any one of the communication nodes includes a communication determination unit and a communication setting unit.

The communication determination unit determines whether a present communication is the fault diagnosis communication. The communication setting unit increases a priority of a priority parameter indicating a priority of a communication when the communication determination unit determines that the present communication is the fault diagnosis communication in a case where the diagnosis request is transmitted from the request source to the request destination or the diagnosis result is transmitted from the request destination to the request source.

According to this configuration, since the priority of the priority parameter indicating the priority of the communication is increased in any one of the plurality of communication nodes, the fault diagnosis communication can be executed with priority. Thereby, the communication time required for the fault diagnosis communication can be reduced without arranging a dedicated communication bus for the fault diagnosis.

Hereinafter, embodiments of the present disclosure will be described with reference to drawings.

1. First Embodiment

1-1. Configuration

Figure 1:
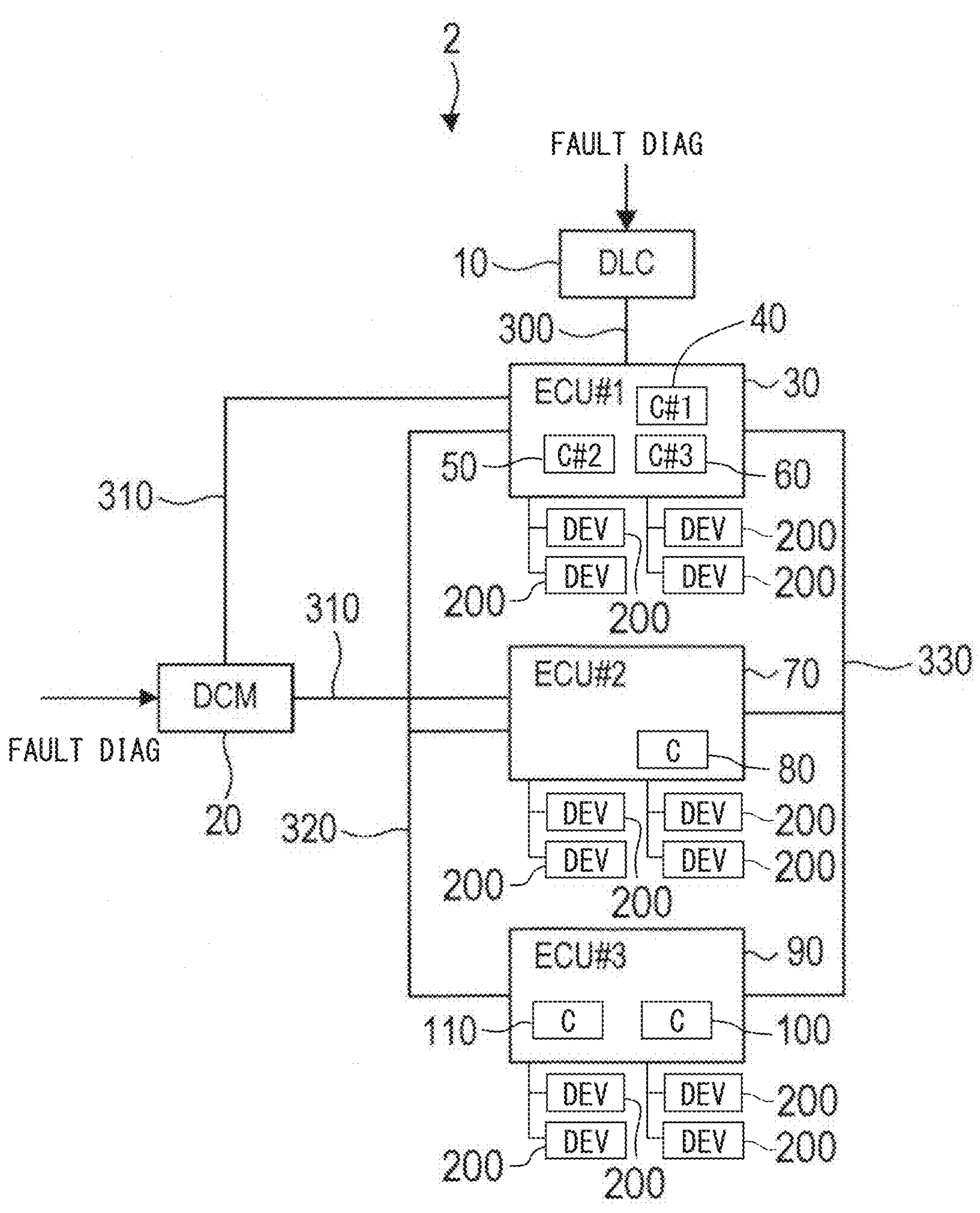
FIG. 1 is a block diagram illustrating the configuration of a communication system according to a first embodiment.

The communication system 2 shown in FIG. 1 is mounted on a vehicle and includes a DLC 10, a DCM 20, and ECUs 30, 70, and 90. ECU is an abbreviation for electronic control unit. The vehicle is equipped with either an internal combustion engine or an electric motor supplied with electric power from a rechargeable battery as a driving source. The internal combustion engine may be used for electric power generation to supply the electric power to the rechargeable battery.

An external tool (not shown) is connected to the DLC 10. In this embodiment, the use of the CAN protocol is defined as the communication standard for fault diagnosis. Therefore, the DLC 10 and the ECU 30 communicate with each other via the bus 300 using the CAN protocol. CAN is a registered trademark and is an abbreviation for Controller Area Network.

The DCM 20 communicates with a server (not shown) or the like via a network. The DCM is the abbreviation for data communication module. The DCM 20 and the ECUs 30 and 70 communicate with each other via the bus 310 using the Ethernet protocol. Ethernet is a registered trademark.

The ECUs 30, 70, and 90 are each connected by a bus 320 compatible with a partial network. The bus 320 is used for normal vehicle control.

Furthermore, the ECUs 30, 70, and 90 are connected via a bus 330. Communication is performed on the bus 330 using the CAN protocol. The bus 330 is not used for normal vehicle control, but is used, for example, for data checking and fault diagnosis when the ECUs 30, 70, and 90 communicate with each other.

In the present embodiment, a diagnosis request from an external tool or a server that is a request source for the fault diagnosis is transmitted to a request destination for the fault diagnosis, such as the ECU 30, 70, 90 or the device 200 connected to the ECU 30, 70, 90.

In this embodiment, since the DLC 10 is connected to the ECU 30, the transmission of the diagnosis request from the external tool via the DLC 10 and the transmission of the diagnosis result to the external tool via the DLC 10 are performed via the ECU 30.

Further, the transmission of the diagnosis request from the server via the DCM 20 and the transmission of the diagnosis result to the server via the DCM 20 are performed via the ECU 30.

For example, when the ECU 70 receives the diagnosis request for the ECU 90 from the server via the DCM 20, the ECU 70 does not transmit the diagnosis request to the ECU 90 but to the ECU 30. The diagnosis request is then transmitted from the ECU 30 to the ECU 90.

Also when transmitting the diagnosis result from the ECU 90 to the server, the ECU 90 does not transmit the diagnosis result to the ECU 70 but to the ECU 30. The diagnosis result is then transmitted from the ECU 30 to the ECU 70.

The transmission of the diagnosis request from the server to the ECU 70 via the DCM 20 and the transmission of the diagnosis result from the ECU 70 to the server via the DCM 20 are also performed from the ECU 70 via the ECU 30.

In this embodiment, the transmission of the diagnosis request and the diagnosis result via the DLC 10 and the DCM 20 is performed via the ECU 30 because only the ECU 30 has the function of checking whether the diagnosis request or the diagnosis result is proper.

Each of the ECUs 30, 70, and 90 includes one or more microcomputers including a processor core, RAM, ROM, and the like. In addition, each of the ECUs 30, 70, and 90 is an ECU with high information processing performance, such as a domain ECU that manages each group classified by function, or a zone ECU that manages each group classified by vehicle position.

Various devices 200 such as a control ECU and an actuator are connected to each of the ECUs 30, 70, and 90. Each of the ECUs 30, 70, and 90 communicates with the device 200 using the CAN protocol, for example.

The ECU 30 includes a plurality of three processor cores 40, 50, and 60, the ECU 70 includes one processor core 80, and the ECU 90 includes two processor cores 100 and 110. The number of processor cores included in the ECUs 30, 70, and 90 is an example, and is not limited to the number described above.

Figure 2:
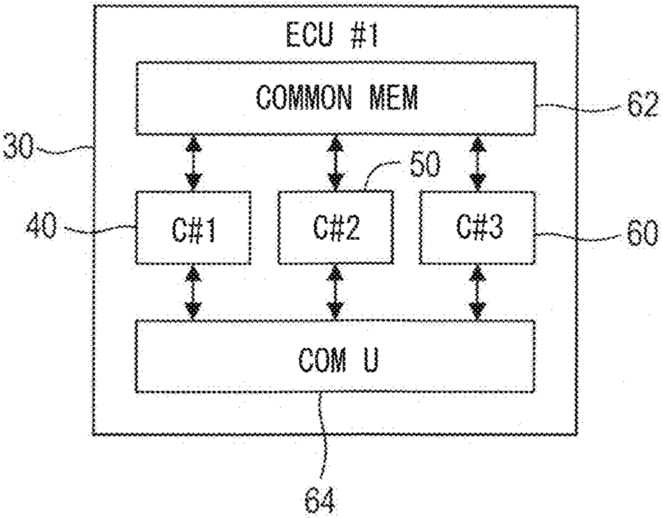
FIG. 2 is a block diagram showing a configuration of an ECU.

As shown in FIG. 2, the ECU 30 includes a common memory 62 and a communication unit 64 in addition to a plurality of processor cores 40, 50, and 60. The communication unit 64 includes a communication controller and a communication switch that are compatible with a communication protocol by which the ECU 30 communicates with the DLC 10, the ECUs 70 and 90, and the device 200 of the ECU 30.

Figure 3:
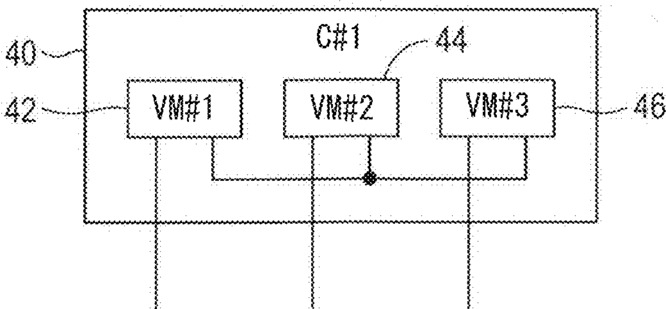
FIG. 3 is a block diagram showing a VM generated by a processor core.

The ECUs 70 and 90 also have the similar configuration as the ECU 30 shown in FIG. 2, although the number of processor cores is different. Further, as shown in FIG. 3, the processor core 40 generates a plurality of VMs 42, 44, and 46. VM is an abbreviation for virtual machine. Other processor cores 50, 60 and processor cores of other ECUs 70, 90 may also generate multiple VMs.

The communication between processor cores 40, 50, and 60 is performed via the common memory 62 or the communication unit 64. Further, the communication between the VMs 42, 44, and 46 is performed via a virtual CAN bus, a virtual CAN FD bus, a virtual Ethernet bus, and the like.

Figure 4:
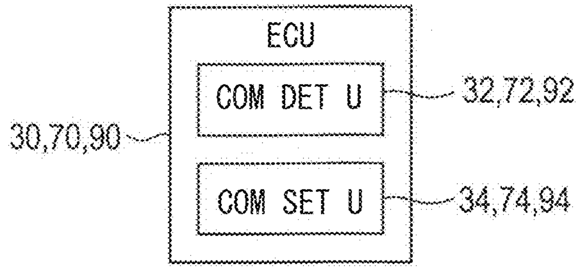
FIG. 4 is a block diagram showing the functions of the ECU.

As shown in FIG. 4, the ECUs 30, 70, and 90 function as communication determination units 32, 72, and 92, and communication setting units 34, 74, and 94, respectively. The functions of the communication determining units 32, 72, 92 and the communication setting units 34, 74, and 94 are described in the following section of (1-2. Fault diagnosis process).

1-2. Fault Diagnosis Process

The fault diagnosis process described below is executed by the ECUs 30, 70, and 90. Here, which processor core of each ECU executes the fault diagnosis process, and furthermore, if any of the processor cores generates a VM, which VM executes the fault diagnosis process are set in advance, or they are determined as appropriate depending on the processing conditions.

(1) Priority Increase Process

(1-1) When Requesting Diagnosis from DLC 10

Figure 6:
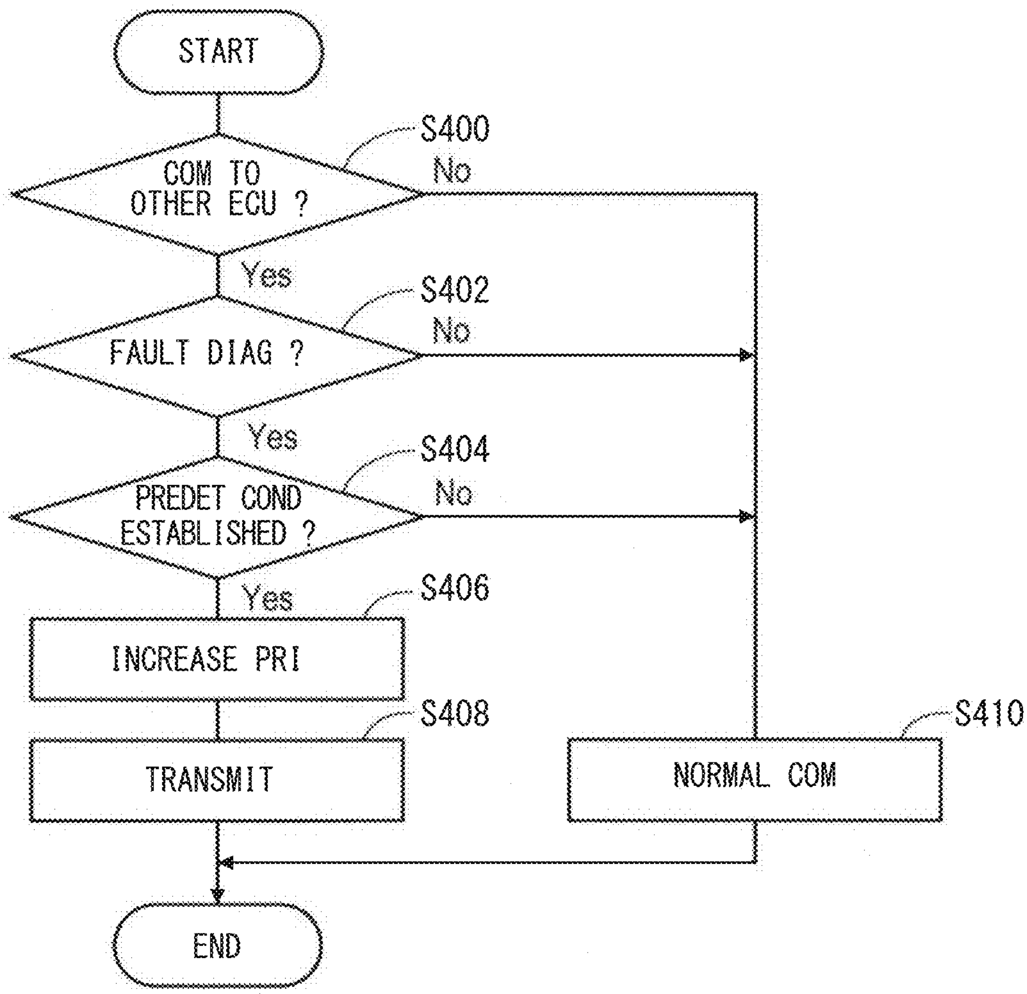
FIG. 6 is a flowchart showing the fault diagnosis communication process.

When the ECU 30 receives communication from the DLC 10 via the bus 300, the communication determination unit 32 determines in S400 of FIG. 6 whether or not the present communication is directed to an ECU other than the subject ECU as a destination.

In the case of the communication from the DLC 10 via the bus 300, the communication determination unit 32 determines whether or not the present communication is directed to an ECU other than the subject ECU as the destination, based on the ID of the received CAN frame.

If the determination in S400 is "NO", that is, if the present communication is not directed to an ECU other than the subject ECU as the destination, the process moves to S410.

If the determination in S400 is "YES", in S402, the communication determination unit 32 determines whether or not the present communication is a fault diagnosis communication, for example, based on the value of data at a predetermined position in the data field of the received CAN frame. In this case, the communication determination unit 32 functions as a first communication determination unit.

If the determination in S402 is "NO", that is, if the present communication is not a fault diagnosis communication, the process moves to S410.

If the determination in S402 is "YES", that is, the present communication is a fault diagnosis communication, in S404, the communication determination unit 32 determines whether a predetermined condition for executing a priority increase process to increase the priority of the communication is satisfied. The predetermined conditions (a) to (e) are described below.

(a) An external tool for the fault diagnosis is connected to the DLC 10.

(b) Either the manual parking gear or handbrake or the electric parking brake is in a state to stop the vehicle.

(c) When the vehicle is equipped with an electric motor as a drive source, the rechargeable battery that supplies the electric power to the electric motor is being charged.

(d) The vehicle is equipped with an internal combustion engine and is being refueled.

(e) In the bus used the present time, the amount of communication other than the fault diagnosis communication is less than a predetermined amount, and the fault diagnosis communication does not interfere with other communications.

If the determination in S404 is "NO", that is, if none of the predetermined conditions (a) to (e) for executing the priority increase process are satisfied, the process moves to S410.

If any of the predetermined conditions (a) to (e) for executing the priority increase process is satisfied, the determination in S404 is "YES".

Figure 5:
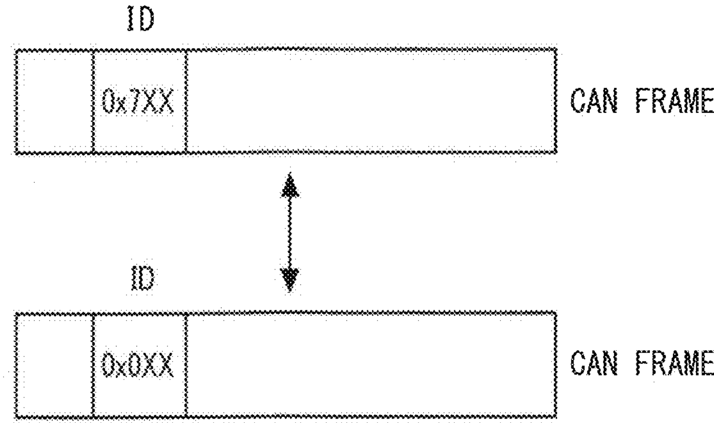
FIG. 5 is a schematic diagram showing the setting of the priority of communication frames.

If the determination in S404 is "YES", in S406, the communication setting unit 34 changes the ID of the CAN frame received from the DLC 10 from "0x7XX" to "0x0XX" to increase the communication priority, as shown in FIG. 5. In this case, the communication setting unit 34 functions as a first communication setting unit.

Then, in S408, the communication setting unit 34 transmits the CAN frame with increased communication priority to the bus 330 to be used at the present time.

In S410, the communication setting unit 34 protocol-converts the received communication frame if normal protocol conversion is necessary, and if it is unnecessary, the communication setting unit 34 does not protocol-convert the received communication frame. Then, the communication setting unit 34 performs normal communication to transmit a communication frame of the corresponding communication protocol. And the process ends.

In the process of S410, the normal protocol conversion indicates a process for analyzing the contents of the received communication frame and rearranging the structure of the communication frame corresponding to the communication protocol to be transmitted.

(1-2) When Requesting Diagnosis from DCM20

When the ECU 70 receives data from the DCM 20 via the bus 310, in S400 of FIG. 6, the communication determination unit 72 determines based on the destination MAC address of the Ethernet frame whether the present communication is the directed to an ECU other than the subject ECU as the destination.

If the determination in S400 is "NO", that is, if the present communication is not directed to an ECU other than the subject ECU as the destination, the communication determination unit 72 moves the process to S410.

If the determination in S400 is "YES", in S402, the communication determination unit 72 determines whether or not the present communication is a fault diagnosis communication, for example, based on the value of data at a predetermined position in the data field of the received Ethernet frame. In this case, the communication determination unit 72 functions as a first communication determination unit.

If the determination in S402 is "NO", that is, if the present communication is not a fault diagnosis communication, the process moves to S410.

If the determination in S402 is "YES", that is, the present communication is a fault diagnosis communication, in S404, the communication determination unit 72 determines whether a predetermined condition for executing the priority increase process is satisfied. Here, in the predetermined condition (e) described above, the communication determination unit 72 determines whether the amount of communication other than the fault diagnosis communication is less than the predetermined amount according to the bus 330 connected to the ECU 30 and the ECU 70.

If the determination in S404 is "NO", that is, if the predetermined condition for executing the priority increase process is not satisfied, the process moves to S410.

If the determination in S404 is "YES", that is, if the predetermined condition for executing the priority increase process is satisfied, in S406, the communication setting unit 74 changes the ID of the CAN frame from "0x7XX" to "0x0XX" in the fault diagnosis, as shown in FIG. 5, to increase the communication priority. In this case, the communication setting unit 74 functions as a first communication setting unit.

Then, in S408, the communication setting unit 74 transmits the CAN frame with increased communication priority to the bus 330 to be used at the present time.

In S410, the communication setting unit 74 executes the normal communication described above, and ends the process.

(1-3) When Transmitting the Diagnostic Result from Subject ECU or the Device of Subject ECU When transmitting the diagnosis result received from the device 200 connected to the ECU 30 or the diagnosis result by the subject ECU, the communication determination unit 32 determines in S400 of FIG. 6 whether the present communication is directed to another ECU other than the subject ECU.

When transmitting the diagnosis result by the subject ECU, the communication determination unit 32 determines whether or not another ECU other than the subject ECU is to be the destination.

On the other hand, in the case of communication from the device 200 connected to the subject ECU, the communication determination unit 32 determines based on the ID of the CAN frame received from the device 200 whether the present communication is directed to another ECU other than the subject ECU is to be the destination.

In the case of the ECU 30, when the subject ECU or the device 200 connected to the subject ECU transmits a diagnosis result in response to a diagnosis request from the DLC 10, the DLC 10 is the destination, and other ECUs are not the destination. In this case, the determination in S400 is "NO".

On the other hand, in response to a diagnosis request from the DCM 20, in the ECU 30, the destination to which the subject ECU or the device 200 connected to the subject ECU transmits the diagnosis result is the ECU 70, which is another ECU. In this case, the determination in S400 is "YES".

In the case of the ECUs 70 and 90, when the subject ECU or the device 200 connected to the subject ECU transmits a diagnosis result in response to a diagnosis request from the DLC 10 or the diagnosis request from the DCM 20, the transmission is once transmitted via the ECU 30 in this embodiment. Therefore, since the ECU 30 becomes the destination as another ECU, the determination in S400 is "YES".

If the determination in S400 is "NO", that is, if the destination of the present communication is not another ECU other than the subject ECU, the process moves to S410.

If the determination in S400 is "YES", that is, the destination of the present communication is another ECU other than the subject ECU, in S402, the communication determination unit 32, 72, 92 determines whether or not the present communication is fault diagnosis communication. In this case, the communication determination unit 32, 72, 92 functions as a second communication determination unit. If the determination in S402 is "NO", that is, if the present communication is not a fault diagnosis communication, the process moves to S410.

If the determination in S402 is "YES", that is, the present communication is a fault diagnosis communication, in S404, the communication determination unit 32, 72, 92 determines whether a predetermined condition for executing the priority increase process is satisfied. If the determination in S404 is "NO", that is, if the predetermined condition for executing the priority increase process is not satisfied, the process moves to S410.

If the determination in S404 is "YES", that is, if the predetermined condition for executing the priority increase process is satisfied, the communication setting unit 34, 74, 94 executes the priority increase process in S406. In this case, the communication setting unit 34, 74, 94 functions as a second communication setting unit.

When transmitting the diagnosis result of the subject ECU, the communication setting units 34, 74, and 94 generate a CAN frame and set the ID of the generated CAN frame to "0x0XX" instead of "0x7XX" to increase the priority of communication.

When the device 200 connected to the subject ECU transmits the diagnosis result, the communication setting unit 34, 74, 94 changes the ID of the CAN frame received from the device 200 from "0x7XX" to "0x0XX" to increase the priority of communication.

The following processing in S408 and S410 is substantially the same as the processing in S408 and S410 at the time of transmitting a diagnosis request from the DLC 10 in (1-1) described above, so a description thereof will be omitted.

(2) Priority Decrease Process

The following processing is executed by any of the ECUs 30, 70, and 90 and is basically the similar processing, so the ECU 30 will be explained as an example.

Figure 7:
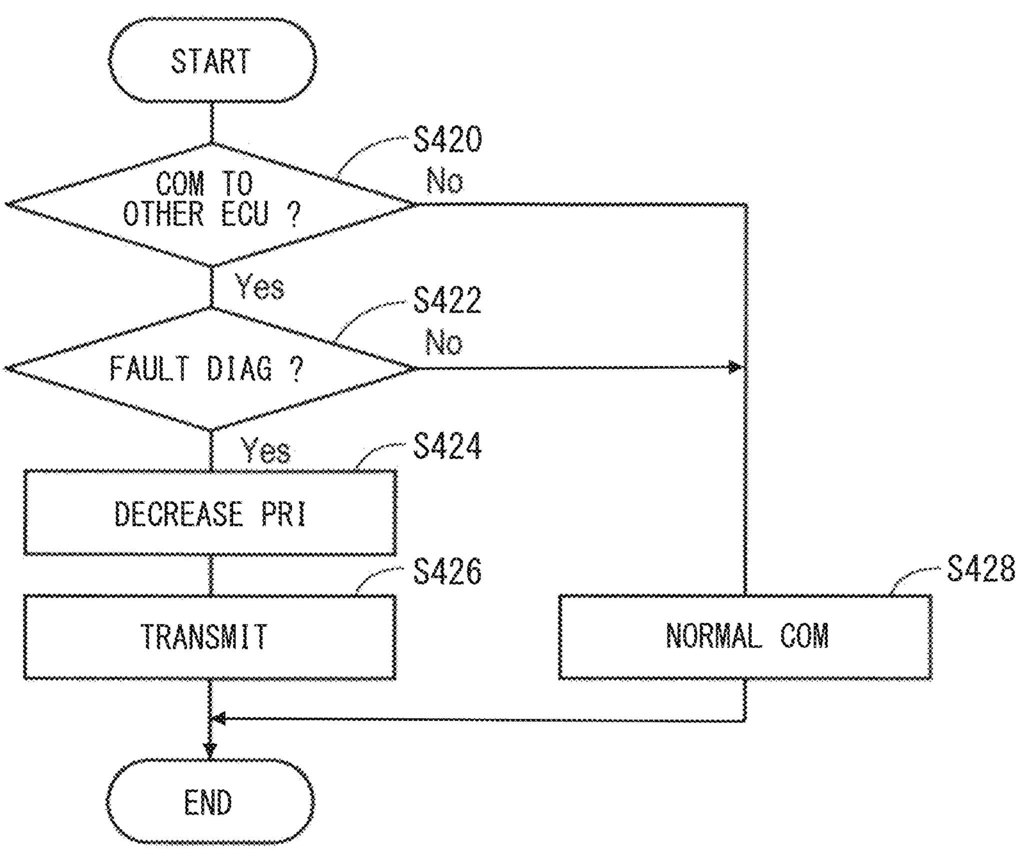
FIG. 7 is a flowchart showing the fault diagnosis communication process.

In S420 of FIG. 7, the communication determination unit 32 determines whether the present communication is from another ECU.

If the determination in S420 is "NO", that is, if the present communication is not from another ECU, the process moves to S428.

If the determination in S420 is "YES", that is, the present communication is the communication from another ECU, the communication determination unit 32 determines in S422 whether or not the present communication is the fault diagnosis communication. In this case, the communication determination unit 32 functions as a second communication determination unit.

The determination in S422 is, for example, "YES" in any of the following cases (a) to (c).

(a) The ECUs 70 and 90 receive from the DLC 10 or the DCM 20 via the ECU 30, a CAN frame indicating a diagnosis request for the subject ECU or the device 200 connected to the subject ECU.

(b) The ECU 30 receives from the ECU 70 a CAN frame indicating a diagnosis request from the DCM 20 to the subject ECU or the device 200 connected to the subject ECU.

(c) The ECU 30 receives from ECU 70, 90 a CAN frame indicating a diagnosis result in response to a diagnosis request from DLC 10.

If the determination in S422 is "NO", that is, if the CAN frame received from another ECU is not due to the fault diagnosis communication, the communication determination unit 32 moves the process to S428.

If the determination in S422 is "YES", that is, the CAN frame received from another ECU is due to the fault diagnosis communication, in S424, the communication setting unit 34 sets the ID of the received CAN frame from "0x0XX" to "0x7XX", as shown in FIG. 5. This process decreases the priority of communication. In this case, the communication setting unit 34 functions as a second communication setting unit.

In S426, the communication setting unit 34 performs a fault diagnosis in the subject ECU based on the received CAN frame, transmits the CAN frame to the device 20 connected to the subject ECU, or transmits the CAN frame to the DLC 10. Then, the communication setting unit 34 ends the process.

In S428, the communication setting unit 34 executes the normal communication described above, and ends the process.

In the first embodiment described above, the part of "0x0" or "0x7" in the ID of the CAN frame indicating the priority corresponds to the priority parameter.

Further, the ECUs 30, 70, 90, the processor cores 40, 50, 60, 80, 100, 1106, the VMs 42, 44, 46 correspond to communication nodes, first communication nodes, and second communication nodes, respectively.

Moreover, the processing of S402, S404, and S422 correspond to the processing of the communication determination unit, and the processing of S406, S408, S424, and S426 correspond to the processing of the communication setting unit.

1-3. Effects

The first embodiment described above produces the following effects.

(1a) Since the priority of communication using the CAN frame is increased in any communication node that relays the fault diagnosis communication, a delay in the fault diagnosis communication can be restricted.

Thereby, the communication time required for the fault diagnosis can be further reduced.

2. Second Embodiment

2-1. Differences from first embodiment

Since a basic configuration of a second embodiment is the same as that of the first embodiment, differences will be described below. The same reference numerals as in the first embodiment denote the same elements, and reference is made to the preceding description.

Figure 8:
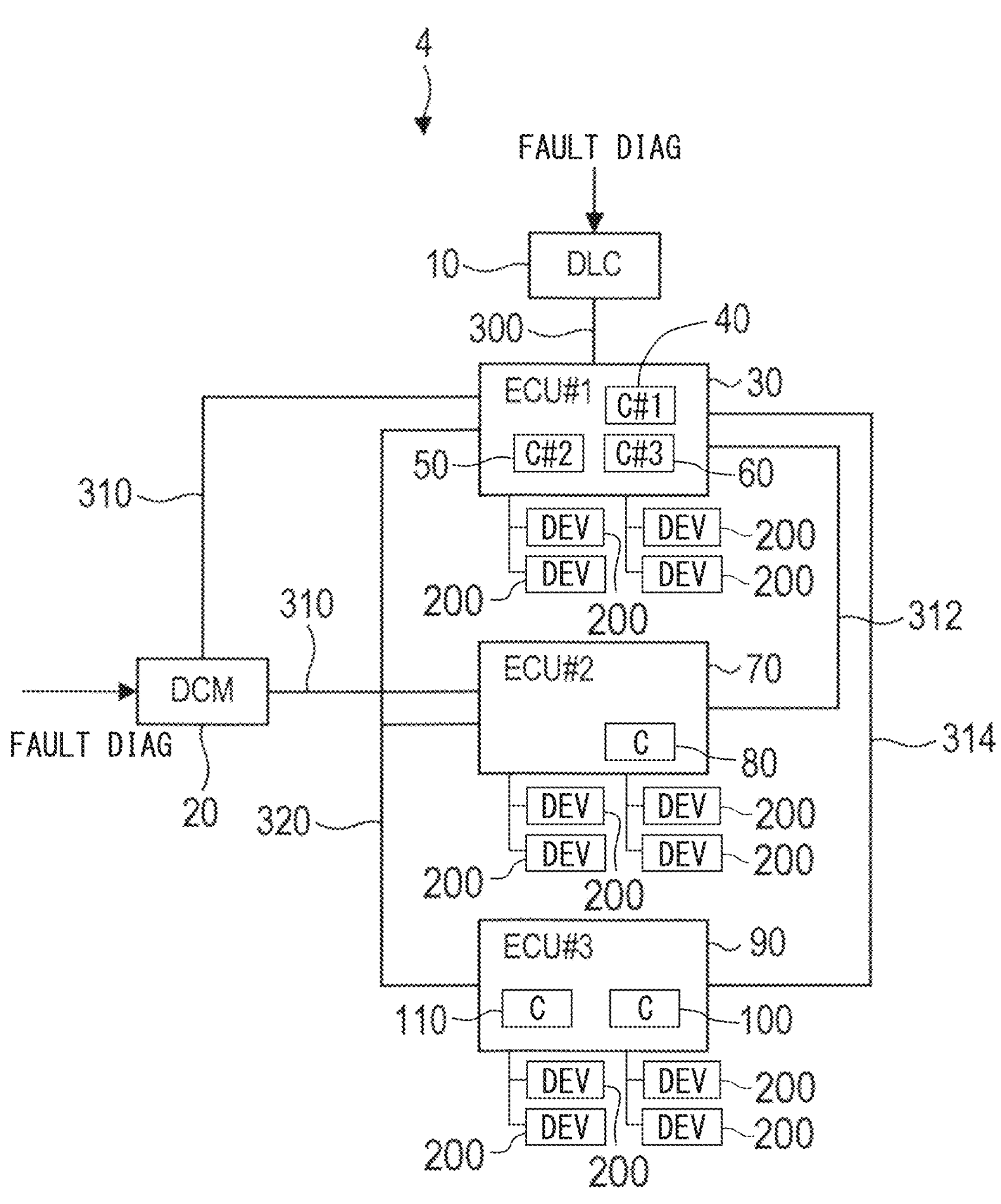
FIG. 8 is a block diagram illustrating the configuration of a communication system according to a second embodiment.

In the first embodiment described above, the ECUs 30, 70, and 90 include a bus 330 that communicates using the CAN protocol. On the other hand, the second embodiment shown in FIG. 8 differs from the first embodiment in that the ECUs 30, 70, and 90 are connected by buses 312 and 314 that communicate using the Ethernet protocol instead of the bus 330.

Here, the buses 312 and 314 may be used for part of normal vehicle control in addition to checking data when the ECUs 30, 70, and 90 communicate with each other.

2-2. Fault Diagnosis Process

(1) Priority Increase Process

(1-1) When Transmitting a Diagnosis Request Via DLC 10

In the following processing, substantially the same processing as S400 to S404 and S410 in FIG. 6 described in (1-1) when transmitting a diagnosis request via DLC 10 of the first embodiment is executed, so the explanation of the corresponding processing will be omitted.

In S406 of FIG. 6, the communication setting unit 34 converts the CAN frame received from the DLC 10 into an Ethernet frame by converting the communication protocol. At this time, the communication setting unit 34 increases the communication priority set in the PCP of the tag field, which is a priority parameter in the Ethernet frame, to be higher than the communication priority indicated by "0x7XX" set in the ID of the CAN frame. In this case, the communication setting unit 34 functions as a first communication setting unit.

Then, in S408, the communication setting unit 34 transmits the Ethernet frame whose communication priority has been increased to the buses 312 and 314 connected to the destination ECU.

(1-2) When Transmitting a Diagnosis Request Via DCM20

In the following processing, substantially the same processing as S400 to S404 and S410 in FIG. 6 described in (1-2) when transmitting a diagnosis request via DCM 20 of the first embodiment is executed, so the explanation of the corresponding processing will be omitted.

In S406 of FIG. 6, the communication setting unit 74 converts the CAN frame used in the diagnosis request into an Ethernet frame by converting the communication protocol. At this time, the communication setting unit 74 sets the priority corresponding to the priority indicated by "0x0XX" of the CAN frame, which has been set to increase the priority of the Ethernet frame in the first embodiment, to the PCP of the tag field of the Ethernet frame, so as to increase the communication priority. In this case, the communication setting unit 74 functions as a first communication setting unit.

Then, in S408, the communication setting unit 74 transmits the Ethernet frame whose communication priority has been increased to the bus 312, either when the request destination of the fault diagnosis is the ECU 30 or when the request destination of the fault diagnosis is the ECU 70 or the ECU 90.

This is because, as described above, only the ECU 30 has the function of checking whether or not the diagnosis request or the diagnosis result is proper, so the ECU 30 executes the proper check of the fault diagnosis.

(1-3) When Transmitting Diagnostic Result from the Subject ECU or the Device 200 Connected to the Subject ECU The following processing is substantially the same as S400 to S404 and S410 in FIG. 6 described in (1-3) when transmitting diagnosis result from the subject ECU or the device 200 connected to the subject ECU in the first embodiment, so the explanation of the corresponding process will be omitted.

In S406, the communication setting units 34, 74, and 94 execute the priority increase process. In this case, the communication setting unit 34, 74, 94 functions as a second communication setting unit.

When transmitting the diagnosis result of the subject ECU, the communication setting unit 34, 74, 94 generates a CAN frame and converts the generated CAN frame into an Ethernet frame in S406.

When the device 200 connected to the subject ECU transmits the diagnosis result, the communication setting unit 34, 74, 94 converts the CAN frame received from the device 200 into an Ethernet frame in S406.

At this time, the communication setting units 34, 74, and 94 set the priority corresponding to the priority indicated by "0x0XX" in the ID of the CAN frame into the PCP of the tag field of the Ethernet frame to increase the priority of communication.

Then, in S408, the communication setting unit 34, 74, 94 transmits the Ethernet frame with increased communication priority to the bus 312 or 314 to which the destination ECU is connected.

(2) Priority Decrease Process

In (2) priority decrease process described in the first embodiment, the present process is substantially the same as the process in which the CAN is replaced with Ethernet, so a description thereof will be omitted.

In the second embodiment described above, the PCP in the tag field of the Ethernet frame corresponds to the priority parameter.

2-3. Effects

According to the second embodiment described above, in effect (1a) of the first embodiment described above, it is possible to acquire substantially the same effect as in the explanation in which the CAN is replaced with the Ethernet.

3. Other Embodiments

Although the embodiment of the present disclosure has been described above, the present disclosure is not limited to the embodiment described above, and various modifications can be made to implement the present disclosure.

(3a) In the above-described embodiment, the priority of the priority parameter indicating the communication priority is increased in both the fault diagnosis communication from the request source of the fault diagnosis to the request destination of the fault diagnosis and the fault diagnosis communication from the request destination of the fault diagnosis to the request source of the fault diagnosis. However, it may not be limited to this feature. The priority of the priority parameter indicating the communication priority may be increased only in one or the other of the communication path from the request source of the fault diagnosis to the request destination of the fault diagnosis and the communication path from the request destination of the fault diagnosis to the request source of the fault diagnosis.

(3b) If the priority of the priority parameter is to be increased, any one of the communication nodes may increase the priority of the priority parameter in the communication path from the request source of the fault diagnosis to the request destination of the fault diagnosis and the communication path from the request destination of the fault diagnosis to the request source of the fault diagnosis.

(3c) In the second embodiment described above, the Ethernet protocol is used in the buses 312 and 314, but the present embodiments may not be limited to this feature. The CAN FD protocol may be used on buses 312, 314.

In this case, in the priority increase process, the ID of the CAN FD protocol is set to "0x0XX". In the priority decrease process, the ID of the CAN FD protocol is set to "0x7XX".

(3d) In the embodiment described above, only the ECU 30 connected to the DLC 10 has the function of checking whether the diagnosis request or the diagnosis result is proper, but the present embodiments may not be limited to this feature.

By providing the ECU 70 connected to the DCM 20 with a function of checking whether the diagnosis request or the diagnosis result is proper, the transmission of the diagnosis request from the ECU 70 and the transmission of the diagnosis result to the ECU 70 may be executed without passing through the ECU 30. In this case, in the second embodiment described above, the ECU 70 needs to be connected to each of the ECUs 30 and 90 via an Ethernet protocol bus.

(3e) In the embodiment described above, the fault diagnosis communication is executed not on the partial network bus 320 used for vehicle control but on the bus 330 or buses 312 and 314 that perform data checks when the ECUs 30, 70, and 90 communicate with each other. Alternatively, the fault diagnosis communication may be executed using the bus 320 used for vehicle control without arranging the buses 330, 312, and 314.

(3f) In the embodiment described above, the communication systems 2 and 4 including three ECUs 30, 70, and 90 are described. In this case, the number of ECUs that relay the fault diagnosis communication is three at most, as described in the second embodiment. Alternatively, the number of ECUs may be four or more. Further, the fault diagnosis communication may be relayed by four or more ECUs.

(3g) The communication system 2, 4 and methods thereof described in the present disclosure may be implemented by a dedicated computer including a processor and a memory programmed to perform one or more functions embodied by a computer program.

Alternatively, the communication system 2, 4 and the method thereof described in the present disclosure may be implemented by a dedicated computer including a processor implemented by one or more dedicated hardware logic circuits.

Alternatively, the communication system 2, 4 and the methods thereof described in the present disclosure may be implemented by one or more dedicated computers implemented by a combination of a processor and memory programmed to execute one or more functions, and a processor implemented by one or more hardware logic circuits.

The computer program may be stored in a computer-readable non-transitory tangible storage medium as instructions to be executed by a computer. The method of implementing the functions of the units included in the communication system 2, 4 does not necessarily include software, and all the functions may be implemented using one or a plurality of pieces of hardware.

(3h) The multiple functions of one component in the above embodiments may be implemented by multiple components, or a function of one component may be implemented by multiple components. Multiple functions of multiple elements may be implemented by one element, or one function implemented by multiple elements may be implemented by one element. A part of the configuration of the above embodiment may be omitted as appropriate. At least a part of the configuration of the above embodiment may be added to or replaced with another configuration of the above embodiment.

(3i) In addition to the communication systems 2 and 4 described above, there are various features for providing the present embodiments such as a program for providing a computer function as the communication system 2 and 4, a non-transitory tangible storage medium such as a semiconductor memory in which the program is stored, and a communication method.

[Feature 1]

A communication system includes a plurality of communication nodes that relay a fault diagnosis communication of a diagnosis request and a diagnosis result between a request source of a fault diagnosis and a request destination of the fault diagnosis. Any one of the communication nodes includes: at least one of (i) a circuit and (ii) a processor having a memory storing computer program code. The at least one of the circuit and the processor having the memory is configured to cause the any one of the communication nodes to provide at least one of: a communication determination unit configured to determine whether a present communication is the fault diagnosis communication; and a communication setting unit configured to increase a priority of a priority parameter indicating the priority of communication when the communication determination unit determines that the present communication is the fault diagnosis communication either one of when the request source transmits the diagnosis request to the request destination or when the request destination transmits the diagnosis result to the request source.

[Feature 2]

In the communication system according to feature 1, the any one of the communication nodes is defined as a first communication node; the communication determination unit is defined as a first communication determination unit; the communication setting unit is defined as a first communication setting unit; the first communication setting unit is configured to increase the priority of the priority parameter when the first communication determination unit determines that the present communication is the fault diagnosis communication either one of when the request source transmits the diagnosis request to the request destination or when the request destination transmits the diagnosis result to the request source; another one of the communication nodes different from the first communication node is defined as a second communication node; the second communication node includes: a second communication determination unit configured to determine whether the present communication is the fault diagnosis communication; and a second communication setting unit configured to decrease the priority of the priority parameter that the first communication setting unit has increased when the second communication determination unit determines that the present communication is the fault diagnosis communication either one of when the request source transmits the diagnosis request to the request destination or when the request destination transmits the diagnosis result to the request source.

[Feature 3]

In the communication system according to feature 2, the second communication setting unit is configured to increase the priority of the priority parameter when the second communication determination unit determines that the present communication is the fault diagnosis communication an other one of when the request source transmits the diagnosis request to the request destination or when the request destination transmits the diagnosis result to the request source; and the first communication setting unit configured to decrease the priority of the priority parameter that the second communication setting unit has increased when the first communication determination unit determines that the present communication is the fault diagnosis communication an other one of when the request source transmits the diagnosis request to the request destination or when the request destination transmits the diagnosis result to the request source.

[Feature 4]

In the communication system according to any one of features 1 to 3, the communication setting unit is configured to increase the priority of the priority parameter when the communication determination unit determines that the present communication is the fault diagnosis communication and at least one of a manual parking gear, a handbrake, and an electric parking brake is in a state to stop a vehicle.

[Feature 5]

In the communication system according to any one of features 1 to 4, the communication setting unit is configured to increase the priority of the priority parameter when the communication determination unit determines that the present communication is the fault diagnosis communication and an external tool for the fault diagnosis is connected to the communication system as the request source for the fault diagnosis.

[Feature 6]

In the communication system according to any one of features 1 to 5, the communication setting unit is configured to increase the priority of the priority parameter when the communication determination unit determines that the present communication is the fault diagnosis communication, a vehicle is equipped with an electric motor as a drive source, and a rechargeable battery for supplying an electric power to the electric motor is being charged.

[Feature 7]

In the communication system according to any one of features 1 to 6, the communication setting unit is configured to increase the priority of the priority parameter when the communication determination unit determines that the present communication is the fault diagnosis communication, a vehicle is equipped with an internal combustion engine, and the vehicle is being refueled.

[Feature 8]

In the communication system according to any one of features 1 to 7, the communication setting unit is configured to increase the priority of the priority parameter when the communication determination unit determines that the present communication is the fault diagnosis communication and an amount of communication other than the fault diagnosis communication is less than or equal to a predetermined amount.

[Feature 9]

In the communication system according to any one of features 1 to 8, at least one of the communication nodes is an electronic control device.

[Feature 10]

In the communication system according to any one of features 1 to 9, at least one of the communication nodes is a processor core.

[Feature 11]

In the communication system according to any one of features 1 to 10, at least one of the communication nodes is a virtual machine.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as disjunctive (logical disjunction) where the circuit and the processor can be optional and not be construed to mean "at least one of a circuit and at least one of a processor". Therefore, in the present disclosure, the phrase "at least one of a circuit and a processor is configured to cause a communication system to perform functions" should be understood that (i) only the circuit can cause a communication system to perform all the functions, (ii) only the processor can cause a communication system to perform all the functions, or (iii) the circuit can cause a communication system to perform at least one of the functions and the processor can cause a communication system to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:

a plurality of communication nodes that relay a fault diagnosis communication of a diagnosis request and a diagnosis result between a request source of a fault diagnosis and a request destination of the fault diagnosis, wherein:

any one of the communication nodes includes:

a communication determination unit configured to determine whether a present communication is the fault diagnosis communication; and a communication setting unit configured to increase a priority of a priority parameter indicating the priority of communication when the communication determination unit determines that the present communication is the fault diagnosis communication either one of when the request source transmits the diagnosis request to the request destination or when the request destination transmits the diagnosis result to the request source;

the any one of the communication nodes is defined as a first communication node;

the communication determination unit is defined as a first communication determination unit;

the communication setting unit is defined as a first communication setting unit;

the first communication setting unit is configured to increase the priority of the priority parameter when the first communication determination unit determines that the present communication is the fault diagnosis communication either one of when the request source transmits the diagnosis request to the request destination or when the request destination transmits the diagnosis result to the request source;

another one of the communication nodes different from the first communication node is defined as a second communication node;

the second communication node includes:

a second communication determination unit configured to determine whether the present communication is the fault diagnosis communication; and a second communication setting unit configured to decrease the priority of the priority parameter that the first communication setting unit has increased when the second communication determination unit determines that the present communication is the fault diagnosis communication either one of when the request source transmits the diagnosis request to the request destination or when the request destination transmits the diagnosis result to the request source.

2. The communication system according to claim 1, wherein the second communication setting unit is configured to increase the priority of the priority parameter when the second communication determination unit determines that the present communication is the fault diagnosis communication an other one of when the request source transmits the diagnosis request to the request destination or when the request destination transmits the diagnosis result to the request source; and the first communication setting unit configured to decrease the priority of the priority parameter that the second communication setting unit has increased when the first communication determination unit determines that the present communication is the fault diagnosis communication an other one of when the request source transmits the diagnosis request to the request destination or when the request destination transmits the diagnosis result to the request source.

3. The communication system according to claim 1, wherein:

the communication setting unit is configured to increase the priority of the priority parameter when the communication determination unit determines that the present communication is the fault diagnosis communication and at least one of a manual parking gear, a handbrake, and an electric parking brake is in a state to stop a vehicle.

4. The communication system according to claim 1, wherein:

the communication setting unit is configured to increase the priority of the priority parameter when the communication determination unit determines that the present communication is the fault diagnosis communication and an external tool for the fault diagnosis is connected to the communication system as the request source for the fault diagnosis.

5. The communication system according to claim 1, wherein:

the communication setting unit is configured to increase the priority of the priority parameter when the communication determination unit determines that the present communication is the fault diagnosis communication, a vehicle is equipped with an electric motor as a drive source, and a rechargeable battery for supplying an electric power to the electric motor is being charged.

6. The communication system according to claim 1, wherein:

the communication setting unit is configured to increase the priority of the priority parameter when the communication determination unit determines that the present communication is the fault diagnosis communication, a vehicle is equipped with an internal combustion engine, and the vehicle is being refueled.

7. The communication system according to claim 1, wherein:

the communication setting unit is configured to increase the priority of the priority parameter when the communication determination unit determines that the present communication is the fault diagnosis communication and an amount of communication other than the fault diagnosis communication is less than or equal to a predetermined amount.

8. The communication system according to claim 1, wherein:

at least one of the communication nodes is an electronic control device.

9. The communication system according to claim 1, wherein:

at least one of the communication nodes is a processor core.

10. The communication system according to claim 1, wherein:

at least one of the communication nodes is a virtual machine.

11. The communication system according to claim 1, wherein:

the any one of the communication nodes includes: at least one of (i) a circuit and (ii) a processor having a memory storing computer program code; and the at least one of the circuit and the processor having the memory is configured to cause the any one of the communication nodes to provide at least one of: the communication determination unit; and the communication setting unit.

* * * * *